(12) United States Patent
Ayinde et al.

(10) Patent No.: US 11,532,084 B2
(45) Date of Patent: Dec. 20, 2022

(54) GATING MACHINE LEARNING PREDICTIONS ON MEDICAL ULTRASOUND IMAGES VIA RISK AND UNCERTAINTY QUANTIFICATION

(71) Applicant: EchoNous, Inc., Redmond, WA (US)

(72) Inventors: Babajide Ayinde, Redmond, WA (US); Eric Wong, Seattle, WA (US); Allen Lu, Seattle, WA (US)

(73) Assignee: ECHONOUS, INC., Redmond, WA (US)

( * ) Notice: Subject to any disclaimer, the term of this patent is extended or adjusted under 35 U.S.C. 154(b) by 198 days.

(21) Appl. No.: 17/088,390

(22) Filed: Nov. 3, 2020

(65) Prior Publication Data
US 2021/0350529 A1 Nov. 11, 2021

Related U.S. Application Data

(60) Provisional application No. 63/022,985, filed on May 11, 2020.

(51) Int. Cl.
*G06T 7/13* (2017.01)
*G06T 7/00* (2017.01)
(Continued)

(52) U.S. Cl.
CPC .......... *G06T 7/0012* (2013.01); *G06K 9/6262* (2013.01); *G06N 20/20* (2019.01);
(Continued)

(58) Field of Classification Search
None
See application file for complete search history.

(56) References Cited

U.S. PATENT DOCUMENTS 9,501,622 B2 * 11/2016 Sankaran ............... G06F 17/18
10,430,946 B1 * 10/2019 Zhou .................. A61B 5/02007
(Continued)

FOREIGN PATENT DOCUMENTS

EP          3536245 A1      9/2019
WO  WO-2017091833 A1 *   6/2017  ......... G01R 33/5608
(Continued)

OTHER PUBLICATIONS

2021/0345992, Nov. 11, 2021, 8.
(Continued)

*Primary Examiner* — Tsung Yin Tsai
(74) *Attorney, Agent, or Firm* — Seed IP Law Group LLP

(57) ABSTRACT

A facility for processing a medical imaging image is described. The facility applies each of a number of constituent models making up an ensemble machine learning models to the image to produce a constituent model result that predicts a value for each pixel of the image. The facility aggregates the results produced by the constituent models of the plurality to determine a result of the ensemble machine learning model. For each of the pixels of the accessed image, the facility determines a measure of variation among the values predicted for the pixel among the constituent models. Facility determines a confidence measure for the ensemble machine learning model result based at least in part on for how many of the pixels of the accessed image a variation measure is determined that exceeds a variation threshold.

39 Claims, 12 Drawing Sheets
(5 of 12 Drawing Sheet(s) Filed in Color)

(51) Int. Cl.
  *G06K 9/62* (2022.01)
  *G06N 20/20* (2019.01)
  *G06V 10/25* (2022.01)
  *G06V 10/75* (2022.01)
(52) U.S. Cl.
  CPC .............. *G06T 7/13* (2017.01); *G06V 10/25* (2022.01); *G06V 10/751* (2022.01); *G06T 2207/10132* (2013.01); *G06T 2207/20081* (2013.01); *G06V 2201/031* (2022.01)

(56) References Cited

U.S. PATENT DOCUMENTS

| | | | |
|---|---|---|---|
| 10,631,828 | B1 | 4/2020 | Hare, II et al. |
| 10,936,160 | B2* | 3/2021 | Sieniek .................. G16H 50/20 |
| 11,051,790 | B2* | 7/2021 | Wodlinger ............ G16H 50/20 |
| 11,056,243 | B2* | 7/2021 | Sjölund .................. A61N 5/103 |
| 11,100,665 | B2* | 8/2021 | Weber ..................... G06T 7/149 |
| 2016/0063175 | A1* | 3/2016 | Choi ...................... A61B 6/504 703/11 |
| 2017/0360403 | A1 | 12/2017 | Rothberg et al. |
| 2018/0259608 | A1 | 9/2018 | Golden et al. |
| 2019/0130554 | A1* | 5/2019 | Rothberg ................ G01S 17/00 |
| 2019/0140596 | A1 | 5/2019 | Shimamoto et al. |
| 2020/0054306 | A1 | 2/2020 | Mehanian et al. |
| 2020/0226422 | A1* | 7/2020 | Li ......................... G06K 9/6228 |
| 2020/0260062 | A1 | 8/2020 | Sharma et al. |
| 2021/0345992 | A1 | 11/2021 | Cook et al. |

FOREIGN PATENT DOCUMENTS

| | | |
|---|---|---|
| WO | WO 2018026431 A1 | 2/2018 |
| WO | WO 2018140596 A2 | 8/2018 |
| WO | WO 2019201726 | 10/2019 |
| WO | WO 2020020809 A1 | 1/2020 |

OTHER PUBLICATIONS

U.S. Appl. No. 17/091,263, filed Nov. 6, 2020, N/A.
U.S. Appl. No. 17/509,987, filed Oct. 25, 2021, N/A.
U.S. Appl. No. 17/529,565, filed Nov. 18, 2021, N/A.
U.S. Appl. No. 17/693,848, filed Mar. 14, 2022, N/A.
Gal, Y., et al., "Dropout as a Bayesian Approximation: Representing Model Uncertainty in Deep Learning," Proceedings of the 33rd International Conference on Machine Learning, New York, NY, 2016, retrieved from arXiv:1506.02142v6, 12 pages.
Geifman, Y., et al., "Selective Classification for Deep Neural Networks," Jun. 2, 2017, retrieved from arXiv:1705.08500v2, 12 pages.
Lakshminarayanan, B., et al., "Simple and Scalable Predictive Uncertainty Estimation Using Deep Ensembles," 31st Conference on Neural Information Processing Systems (NIPS 2017), Long Beach, CA, retrieved from arXiv:1612.01474v3, 15 pages.
American Institute of Ultrasound in Medicine, "AIUM Practice Guideline for the Performance of the Focused Assessment With Sonography for Trauma (FAST) Examination," *J Ultrasound Med* 33:2047-2056, 2014.
International Search Report and Written Opinion, dated Aug. 25, 2021, for International Application No. PCT/US2021/031415, 10 pages.
International Search Report and Written Opinion, dated Feb. 24, 2022, for International Application No. PCT/US2021/058037. (11 pages).
International Search Report and Written Opinion, dated Oct. 12, 2021, for International Application No. PCT/US2021/031193, 9 pages.
Liu, S. et al., "Deep learning in Medical Ultrasound Analysis: A Review," (2019). Engineering, 5(2): 261-275.
Redmon et al., "YOLOv3: An Incremental Improvement," Apr. 8, 2018, retrieved from arxiv.org/abs/1804.02767, 6 pages.

\* cited by examiner

GATING MACHINE LEARNING PREDICTIONS ON MEDICAL ULTRASOUND IMAGES VIA RISK AND UNCERTAINTY QUANTIFICATION

CROSS-REFERENCE TO RELATED APPLICATIONS

This application claims the benefit of 63/022,985, filed May 11, 2020 and entitled "GATING MACHINE LEARNING PREDICTIONS ON MEDICAL ULTRASOUND IMAGES VIA RISK AND UNCERTAINTY QUANTIFICATION," which is hereby incorporated by reference in its entirety.

In cases where the present application conflicts with a document incorporated by reference, the present application controls.

BACKGROUND

Ultrasound imaging is a useful medical imaging modality. For example, internal structures of a patient's body may be imaged before, during or after a therapeutic intervention. Also, qualitative and quantitative observations in an ultrasound image can be a basis for diagnosis. For example, ventricular volume determined via ultrasound is a basis for diagnosing, for example, ventricular systolic dysfunction and diastolic heart failure.

A healthcare professional typically holds a portable ultrasound probe, sometimes called a "transducer," in proximity to the patient and moves the transducer as appropriate to visualize one or more target structures in a region of interest in the patient. A transducer may be placed on the surface of the body or, in some procedures, a transducer is inserted inside the patient's body. The healthcare professional coordinates the movement of the transducer so as to obtain a desired representation on a screen, such as a two-dimensional cross-section of a three-dimensional volume.

Particular views of an organ or other tissue or body feature (such as fluids, bones, joints or the like) can be clinically significant. Such views may be prescribed by clinical standards as views that should be captured by the ultrasound operator, depending on the target organ, diagnostic purpose or the like.

In some ultrasound images, it is useful to identify anatomical structures visualized in the image. For example in an ultrasound image view showing a particular organ, it can be useful to identify constituent structures within the organ. As one example, in some views of the heart, constituent structures are visible, such as the left and right atria; left and right ventricles; and aortic, mitral, pulmonary, and tricuspid valves.

Existing software solutions have sought to identify such structures automatically. These existing solutions seek to "detect" a structure by, for example, "segmenting" the structure by identify the pixels in the image that show the structure.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION

Figure 1:
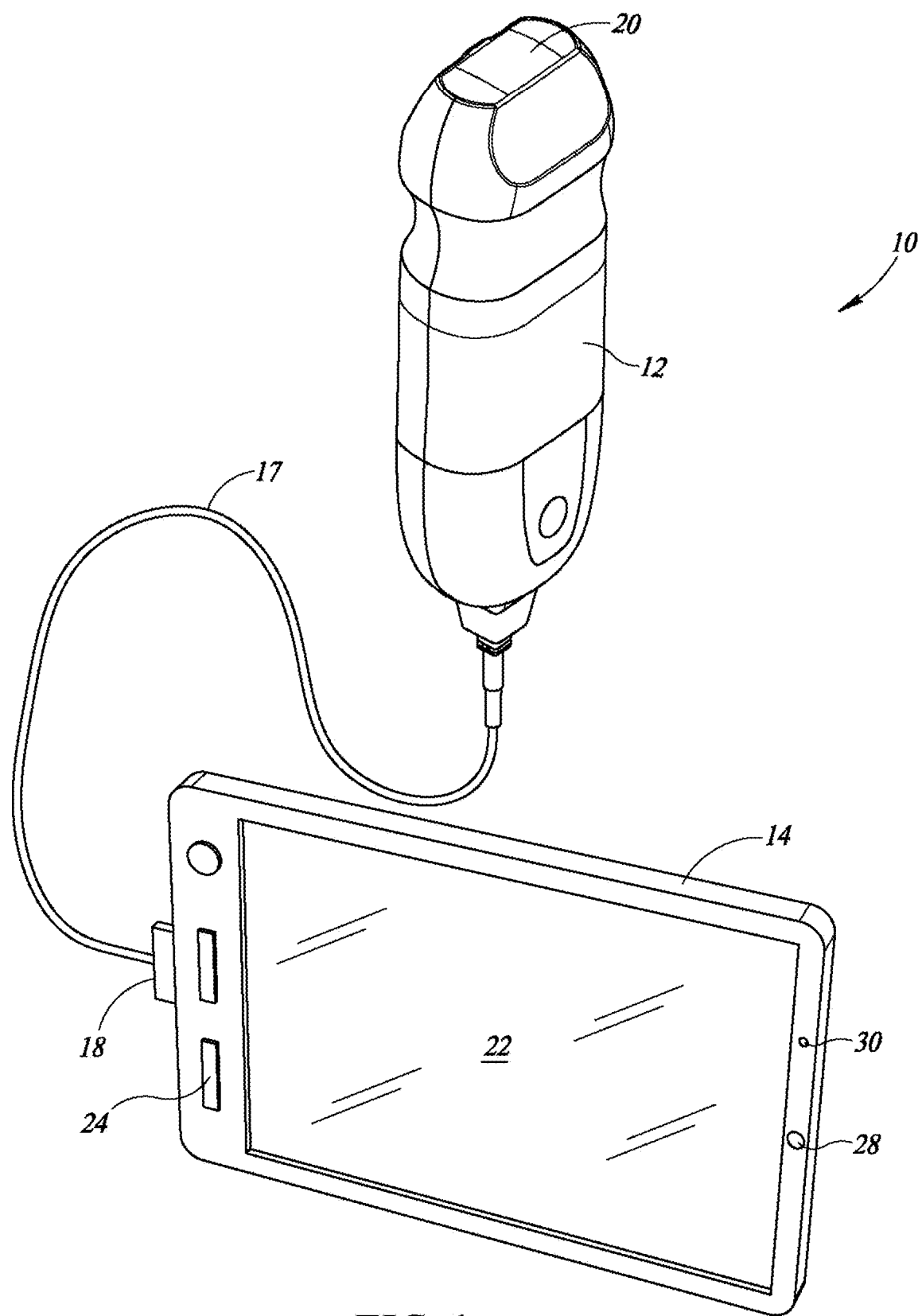
FIG. 1 is a block diagram showing some of the components typically incorporated in at least some of the computer systems and other devices on which the facility operates.

The inventors have recognized that conventional approaches to automatically identifying constituent structures of organs shown in ultrasound images have significant disadvantages. In particular, these conventional approaches tend to be opaque black-box algorithms that provide a final prediction for a given input without intermediate outputs or indications of model confidence that the prediction is accurate. As a result, these conventional approaches present both accurate predictions—such as those based on diagnostic-quality medical images—and highly inaccurate predictions—such as those based on suboptimal images—identically, may at best lead to mistrust of the process by the clinician end-user, or at worst result in misdiagnoses and compounded clinical error.

In response to recognizing these disadvantages, the inventors have conceived and reduced to practice a software and/or hardware facility that differentially acts on machine learning predictions from medical images based on uncertainty determinations ("the facility"). By doing so, the facility increases both the quality of predictions used for medical purposes and increases confidence in such predictions.

In some embodiments, the facility subjects a medical image of a patient, such as an ultrasound image of an organ of the patient, to each of multiple independent prediction models, such as models trained to produce a segmentation mask identifying pixels in the image that are part of a particular anatomical structure, such as a structure within the heart. This collection of models is sometimes referred to as an "ensemble model," and the individual models of which it is comprised are sometimes called "constituent models" or "submodels."

The facility combines the results produced by the submodels to obtain an overall result for the ensemble model. In some embodiments, the facility performs this combination by, for each pixel of the input image, applying an aggregation function such as arithmetic mean across the values of that pixel in the submodel result masks. For example, where the ensemble includes 3 submodels, and for a particular pixel the result produced by two of the submodels is 1, indicating that the pixel is within the structure being segmented, and the result produced by the other submodel is 0, indicating that the pixel is not within the structure, in some embodiments the facility applies the arithmetic mean aggregation function to the values {1, 1, 0} to obtain a raw aggregation result for the pixel of 0.67. The facility transforms this raw aggregation result to a binary value by rounding raw aggregation results greater than 0.5 up to 1, and all other raw aggregation results down to 0. Thus, the facility rounds the raw aggregation result of the example, 0.67, up to 1 for population to a binary aggregation result mask constituting the ensemble model prediction for structure segmentation.

The facility goes on to calculate a confidence metric for the ensemble model prediction. In some embodiments, the facility obtains the confidence metric by determining an uncertainty metric, then multiplicatively inverting it. The facility determines the uncertainty metric by first calculating, for each pixel, a variance measure of the results produced for the pixel by the constituent models from the result produced by the ensemble. These per-pixel variances together constitute a pixel-wise measure of uncertainty in the ensemble result mask. The facility then determines the uncertainty for the entire ensemble result mask by calculating the ratio of number of pixels with a variance that exceeds a variance threshold—such as zero—to the number of pixels within the binary aggregation result mask.

The facility then takes differential action on the ensemble model prediction based on the confidence metric. For example, in some embodiments, where the confidence metric exceeds a confidence threshold, the facility uses the ensemble model prediction to automatically determine and present a diagnosis based on the ensemble model prediction. In some embodiments, where the confidence metric is below a confidence threshold, the facility takes different action, such as warning a clinician, prompting a clinician to capture a substitute image, automatically capturing a substitute image, etc. In some embodiments, the facility chooses among multiple other actions based upon the amount by which the confidence metric falls short of the confidence threshold.

In some embodiments, the facility determines the confidence threshold empirically, in some cases based on a percentage of the model's predictions that qualified sonographers or other domain experts find to be of acceptable quality.

In some embodiments, the facility displays the patient image, annotated to show the pixel-wise uncertainty, such as by superimposing a heat map reflecting the uncertainty level of each pixel. In some cases, the facility also annotates the displayed patient image to show a "contour" version of the ensemble model prediction that shows the pixels on a border between the regions of the segmentation mask. These displays can assist a user to understand which parts of the image the model is unsure about, focus on whether the segmentation prediction seems accurate, determine how to capture a more useful substitute patient image, etc.

By performing in some or all of the ways described above, the facility improves the statistical accuracy of processes based on ensemble model predictions, and builds confidence in both these predictions and the processes that use them.

Additionally, the facility improves the functioning of computer or other hardware, such as by reducing the dynamic display area, processing, storage, and/or data transmission resources needed to perform a certain task, thereby enabling the task to be permitted by less capable, capacious, and/or expensive hardware devices, and/or be performed with lesser latency, and/or preserving more of the conserved resources for use in performing other tasks. In both cases, this permits an organization performing ultrasound imaging to purchase fewer copies of an ultrasound apparatus, or operate an unreduced number of copies at a lower utilization rate, which can extend their useful lifespan, improve their operational status at every time in their lifespan, reduce the need for intra-lifespan servicing and calibration, etc.

FIG. 1 is a schematic illustration of a physiological sensing device 10, in accordance with one or more embodiments of the present disclosure. The device 10 includes a probe 12 that, in the illustrated embodiment, is electrically coupled to a handheld computing device 14 by a cable 17. The cable 17 includes a connector 18 that detachably connects the probe 12 to the computing device 14. The handheld computing device 14 may be any portable computing device having a display, such as a tablet computer, a smartphone, or the like. In some embodiments, the probe 12 need not be electrically coupled to the handheld computing device 14, but may operate independently of the handheld computing device 14, and the probe 12 may communicate with the handheld computing device 14 via a wireless communication channel.

The probe 12 is configured to transmit an ultrasound signal toward a target structure and to receive echo signals returning from the target structure in response to transmission of the ultrasound signal. The probe 12 includes an ultrasound sensor 20 that, in various embodiments, may include an array of transducer elements (e.g., a transducer array) capable of transmitting an ultrasound signal and receiving subsequent echo signals.

The device 10 further includes processing circuitry and driving circuitry. In part, the processing circuitry controls the transmission of the ultrasound signal from the ultrasound sensor 20. The driving circuitry is operatively coupled to the ultrasound sensor 20 for driving the transmission of the ultrasound signal, e.g., in response to a control signal received from the processing circuitry. The driving circuitry and processor circuitry may be included in one or both of the probe 12 and the handheld computing device 14. The device 10 also includes a power supply that provides power to the driving circuitry for transmission of the ultrasound signal, for example, in a pulsed wave or a continuous wave mode of operation.

The ultrasound sensor 20 of the probe 12 may include one or more transmit transducer elements that transmit the ultrasound signal and one or more receive transducer elements that receive echo signals returning from a target structure in response to transmission of the ultrasound signal. In some embodiments, some or all of the transducer elements of the ultrasound sensor 20 may act as transmit transducer elements during a first period of time and as receive transducer elements during a second period of time that is different than the first period of time (i.e., the same transducer elements may be usable to transmit the ultrasound signal and to receive echo signals at different times).

The computing device 14 shown in FIG. 1 includes a display screen 22 and a user interface 24. The display screen 22 may be a display incorporating any type of display technology including, but not limited to, LCD or LED display technology. The display screen 22 is used to display one or more images generated from echo data obtained from the echo signals received in response to transmission of an ultrasound signal, and in some embodiments, the display screen 22 may be used to display color flow image information, for example, as may be provided in a Color Doppler imaging (CDI) mode. Moreover, in some embodiments, the display screen 22 may be used to display audio waveforms, such as waveforms representative of an acquired or conditioned auscultation signal.

In some embodiments, the display screen 22 may be a touch screen capable of receiving input from a user that touches the screen. In such embodiments, the user interface 24 may include a portion or the entire display screen 22, which is capable of receiving user input via touch. In some embodiments, the user interface 24 may include one or more buttons, knobs, switches, and the like, capable of receiving input from a user of the ultrasound device 10. In some embodiments, the user interface 24 may include a microphone 30 capable of receiving audible input, such as voice commands.

The computing device 14 may further include one or more audio speakers 28 that may be used to output acquired or conditioned auscultation signals, or audible representations of echo signals, blood flow during Doppler ultrasound imaging, or other features derived from operation of the device 10.

The probe 12 includes a housing, which forms an external portion of the probe 12. The housing includes a sensor portion located near a distal end of the housing, and a handle portion located between a proximal end and the distal end of the housing. The handle portion is proximally located with respect to the sensor portion.

The handle portion is a portion of the housing that is gripped by a user to hold, control, and manipulate the probe 12 during use. The handle portion may include gripping features, such as one or more detents, and in some embodiments, the handle portion may have a same general shape as portions of the housing that are distal to, or proximal to, the handle portion.

The housing surrounds internal electronic components and/or circuitry of the probe 12, including, for example, electronics such as driving circuitry, processing circuitry, oscillators, beamforming circuitry, filtering circuitry, and the like. The housing may be formed to surround or at least partially surround externally located portions of the probe 12, such as a sensing surface. The housing may be a sealed housing, such that moisture, liquid or other fluids are prevented from entering the housing. The housing may be formed of any suitable materials, and in some embodiments, the housing is formed of a plastic material. The housing may be formed of a single piece (e.g., a single material that is molded surrounding the internal components) or may be formed of two or more pieces (e.g., upper and lower halves) which are bonded or otherwise attached to one another.

In some embodiments, the probe 12 includes a motion sensor. The motion sensor is operable to sense a motion of the probe 12. The motion sensor is included in or on the probe 12 and may include, for example, one or more accelerometers, magnetometers, or gyroscopes for sensing motion of the probe 12. For example, the motion sensor may be or include any of a piezoelectric, piezoresistive, or capacitive accelerometer capable of sensing motion of the probe 12. In some embodiments, the motion sensor is a tri-axial motion sensor capable of sensing motion about any of three axes. In some embodiments, more than one motion sensor 16 is included in or on the probe 12. In some embodiments, the motion sensor includes at least one accelerometer and at least one gyroscope.

The motion sensor may be housed at least partially within the housing of the probe 12. In some embodiments, the motion sensor is positioned at or near the sensing surface of the probe 12. In some embodiments, the sensing surface is a surface which is operably brought into contact with a patient during an examination, such as for ultrasound imaging or auscultation sensing. The ultrasound sensor 20 and one or more auscultation sensors are positioned on, at, or near the sensing surface.

In some embodiments, the transducer array of the ultrasound sensor 20 is a one-dimensional (1D) array or a two-dimensional (2D) array of transducer elements. The transducer array may include piezoelectric ceramics, such as lead zirconate titanate (PZT), or may be based on microelectromechanical systems (MEMS). For example, in various embodiments, the ultrasound sensor 20 may include piezoelectric micromachined ultrasonic transducers (PMUT), which are microelectromechanical systems (MEMS)-based piezoelectric ultrasonic transducers, or the ultrasound sensor 20 may include capacitive micromachined ultrasound transducers (CMUT) in which the energy transduction is provided due to a change in capacitance.

The ultrasound sensor 20 may further include an ultrasound focusing lens, which may be positioned over the transducer array, and which may form a part of the sensing surface. The focusing lens may be any lens operable to focus a transmitted ultrasound beam from the transducer array toward a patient and/or to focus a reflected ultrasound beam from the patient to the transducer array. The ultrasound focusing lens may have a curved surface shape in some embodiments. The ultrasound focusing lens may have different shapes, depending on a desired application, e.g., a desired operating frequency, or the like. The ultrasound focusing lens may be formed of any suitable material, and in some embodiments, the ultrasound focusing lens is formed of a room-temperature-vulcanizing (RTV) rubber material.

In some embodiments, first and second membranes are positioned adjacent to opposite sides of the ultrasound sensor 20 and form a part of the sensing surface. The membranes may be formed of any suitable material, and in some embodiments, the membranes are formed of a room-temperature-vulcanizing (RTV) rubber material. In some embodiments, the membranes are formed of a same material as the ultrasound focusing lens.

Figure 2:
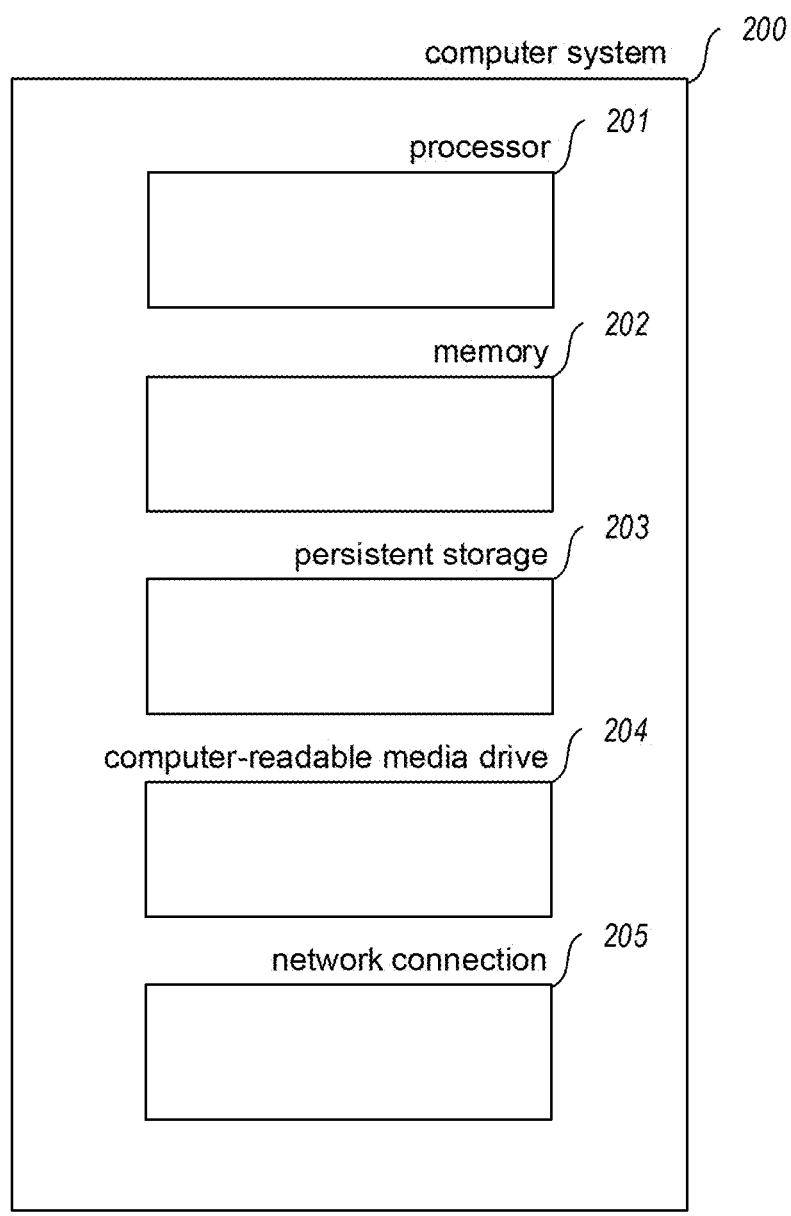
FIG. 2 is a block diagram showing some of the components typically incorporated in at least some of the computer systems and other devices on which the facility operates.

FIG. 2 is a block diagram showing some of the components typically incorporated in at least some of the computer systems and other devices on which the facility operates. In various embodiments, these computer systems and other devices 200 can include server computer systems, cloud computing platforms or virtual machines in other configurations, desktop computer systems, laptop computer systems, netbooks, mobile phones, personal digital assistants, televisions, cameras, automobile computers, electronic media players, physiological sensing devices, and/or their associated display devices, etc. In various embodiments, the computer systems and devices include zero or more of each of the following: a processor 201 for executing computer programs and/or training or applying machine learning models, such as a CPU, GPU, TPU, NNP, FPGA, or ASIC; a computer memory 202 for storing programs and data while they are being used, including the facility and associated data, an operating system including a kernel, and device drivers; a persistent storage device 203, such as a hard drive or flash drive for persistently storing programs and data; a computer-readable media drive 204, such as a floppy, CD-ROM, or DVD drive, for reading programs and data stored on a computer-readable medium; and a network connection 205 for connecting the computer system to other computer systems to send and/or receive data, such as via the Internet or another network and its networking hardware, such as switches, routers, repeaters, electrical cables and optical fibers, light emitters and receivers, radio transmitters and receivers, and the like. While computer systems configured as described above are typically used to support the operation of the facility, those skilled in the art will appreciate that the facility may be implemented using devices of various types and configurations, and having various components.

Figure 3:
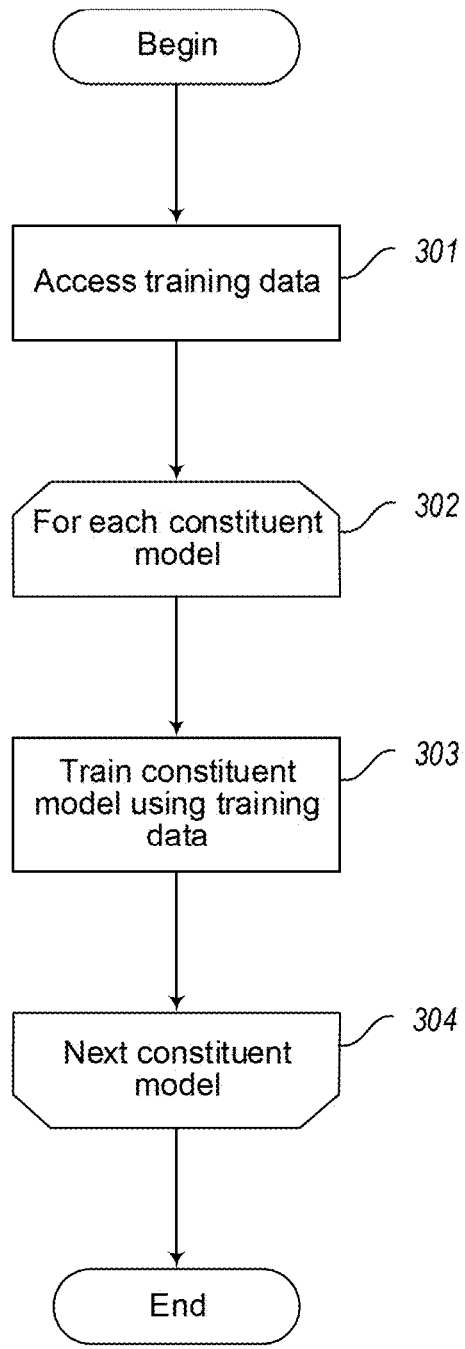
FIG. 3 is a flow diagram showing a process performed by the facility in some embodiments to train the ensemble model used by the facility.

FIG. 3 is a flow diagram showing a process performed by the facility in some embodiments to train the ensemble model used by the facility. In act 301, the facility accesses training data. In some embodiments, the training data accessed by the facility in act 301 is a set of radiological patient images, such as ultrasounds images all of the same human organ, all from a similar perspective. In some embodiments, the training data also includes segmentation masks for each of the patient images that have been constructed from those patient images and/or approved with reference to the patient images by a sonographer or other domain expert. In acts 302-304, the facility loops through each of the ensemble's constituent models. In act 303, the facility trains the constituent model using the training data accessed in act 301. In some embodiments, at least some of the constituent models are of different model types, have different structures, are configured differently, etc. In some embodiments, different overlapping or non-overlapping portions of the accessed training data are used to train different constituent models. In act 304, if additional constituent models remain to be trained, then the facility continues in act 301 to train the next constituent model, else this process concludes.

Those skilled in the art will appreciate that the acts shown in FIG. 3 and in each of the flow diagrams discussed below may be altered in a variety of ways. For example, the order of the acts may be rearranged; some acts may be performed in parallel; shown acts may be omitted, or other acts may be included; a shown act may be divided into subacts, or multiple shown acts may be combined into a single act, etc.

Figure 4:
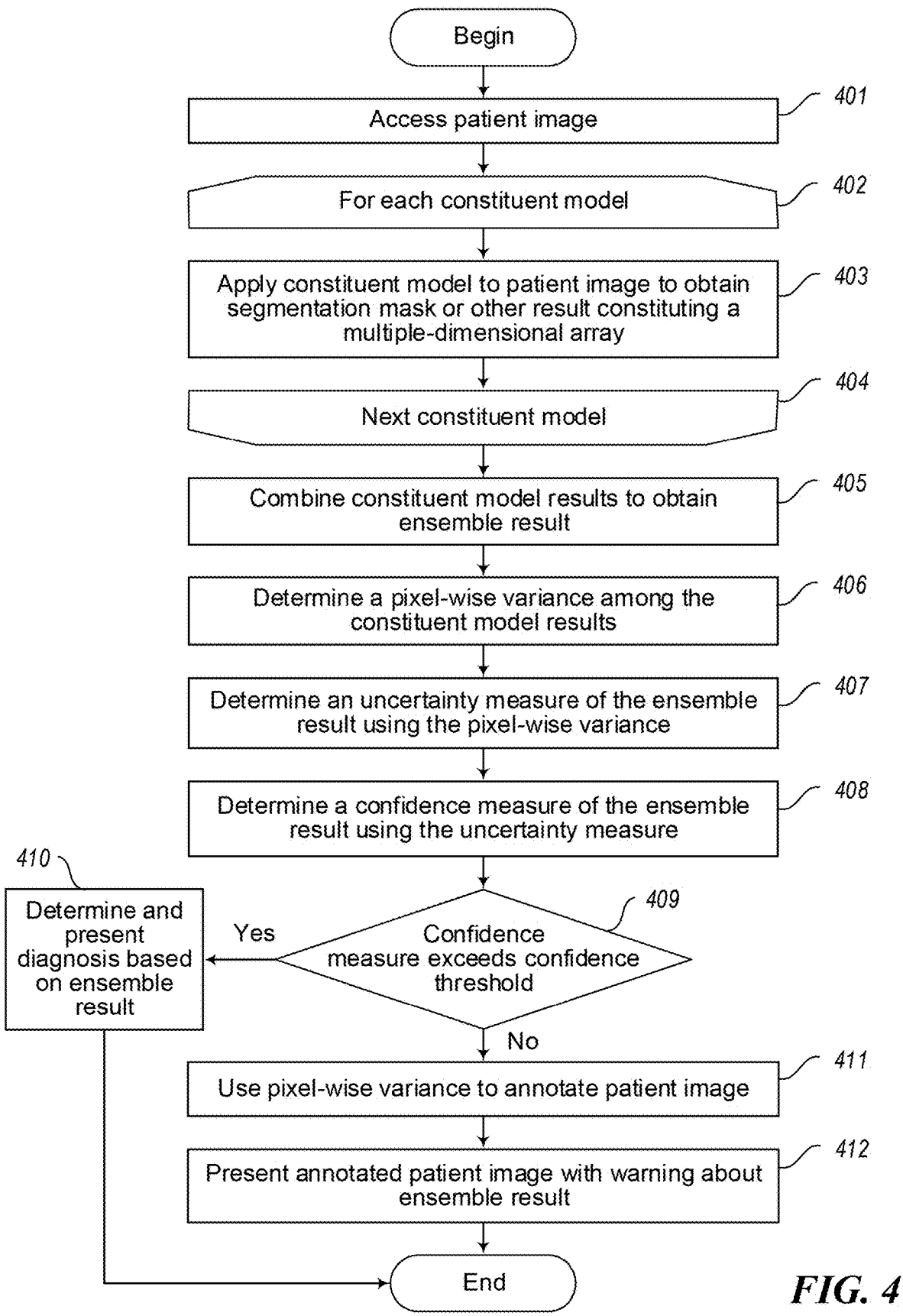
FIG. 4 is a flow diagram showing a process performed by the facility in some embodiments to process a patient image in production.

FIG. 4 is a flow diagram showing a process performed by the facility in some embodiments to process a patient image in production. In act 401, the facility accesses a patient image, such as a patient image contemporaneously captured by a handheld ultrasound device connected to the computing system and on which the portion of the facility performing this process is executed. In acts 402-404, the facility loops through the constituent models of the ensemble. In act 403, the facility applies the constituent model to the patient image accessed in act 401 to obtain a segmentation mask, or another type of prediction or other result. The obtained constituent model result is a multiple-dimensional array, such as a rectangular array whose dimensions match those of the patient image. In act 404, if additional constituent models remain to be applied, then the facility continues in act 402 to apply the next constituent model. In act 405, the facility combines the results produced by the constituent models to obtain an ensemble result. In some embodiments, this involves, for each pixel of the multi-dimensional arrays constituting the constituent model results, determining the arithmetic mean across the constituent models for the pixel. This can be shown as equation 1 below, where M' is the ensemble result for a particular pixel, N is the number of constituent models, n is the model currently under consideration, and $A_n$ is the value in the current pixel in the result produced by the current constituent:

$$M' = \frac{1}{N} \sum_n^N A_n \qquad (1)$$

In some embodiments, the facility transforms the ensemble result into a binary mask representation of the ensemble result, such as by rounding pixel values greater than 0.5 up to 1, and other pixel values down to zero.

In act 406, the facility determines a pixel-wise variance among the constituent model results. The facility calculates the ensemble variance by taking the 1-σ pixel-wise standard deviation of across the constituent model result binary masks $A_n$. For a pixel $p_{i,j}^n$ at location (i, j) in binary mask $A_n$, and corresponding pixel $\mu_{i,j}$ in the mean mask M, this operation may be denoted as:

$$\sigma = \frac{1}{K-1} \sqrt{\sum_n^N (x_{i,j}^n - \mu_{i,j})^2} \qquad (2)$$

where K=h×w is the total number of pixels in the image, and K−1 appears in the denominator to properly account for the degrees of freedom used to estimate the standard deviation.

The resulting output is an array of size (h, w) that may assume continuous values in the interval (0, 1). The output image acts as a heat map, localizing regions of high prediction variance along the mean contour. If all constituent models predict the same value, then $x_{i,j}^n = \mu_{i,j}$ for all n, and the variance is 0, indicating a highly confident prediction at location (i, j). In the case of N=3, the most variance that may be achieved is that ⅔ models predict the same binary value, and so the variance prediction may only assume values of 0 or ~0.47.

In act 407, the facility determines an uncertainty measure of the ensemble result using the pixel-wise variance. In some embodiments, the facility determines the uncertainty measure by counting the number of pixels in the pixel-wise variance whose values is greater than a variance threshold—such as zero—then dividing by the number of pixels in the ensemble result that are non-zero—(i.e., that are included in the ensemble result mask). In act 408, the facility determines the confidence measure of the ensemble result using the uncertainty measure determined in act 407. In some embodiments, the facility determines the confidence measure by multiplicatively inverting the uncertainty measure determined in act 407. In act 409, if the confidence measure determined in act 408 exceeds a confidence threshold, then the facility continues in act 410, else the facility continues in act 411. In act 410, the facility determines and presents a diagnosis based upon the ensemble result determined in act 405. In various embodiments, the facility takes a variety of additional or substitute actions where the confidence measure exceeds the confidence threshold. After act 410, this process concludes. In act 411, the facility uses the pixel-wise variance to annotate the image, showing regions of the image where the result had the highest levels of uncertainty. In act 412, the facility causes to be presented the annotated patient image produced in act 411 with a warning about the quality of the ensemble result. In various embodiments, the facility performs various additional or substitute steps in response to determining that the confidence measure does not exceed the confidence threshold, which can include automatically capturing a new image of the same patient. After act 412, this process concludes.

FIGS. 5-9 show the facility's processing of a first sample patient image.

Figure 5:
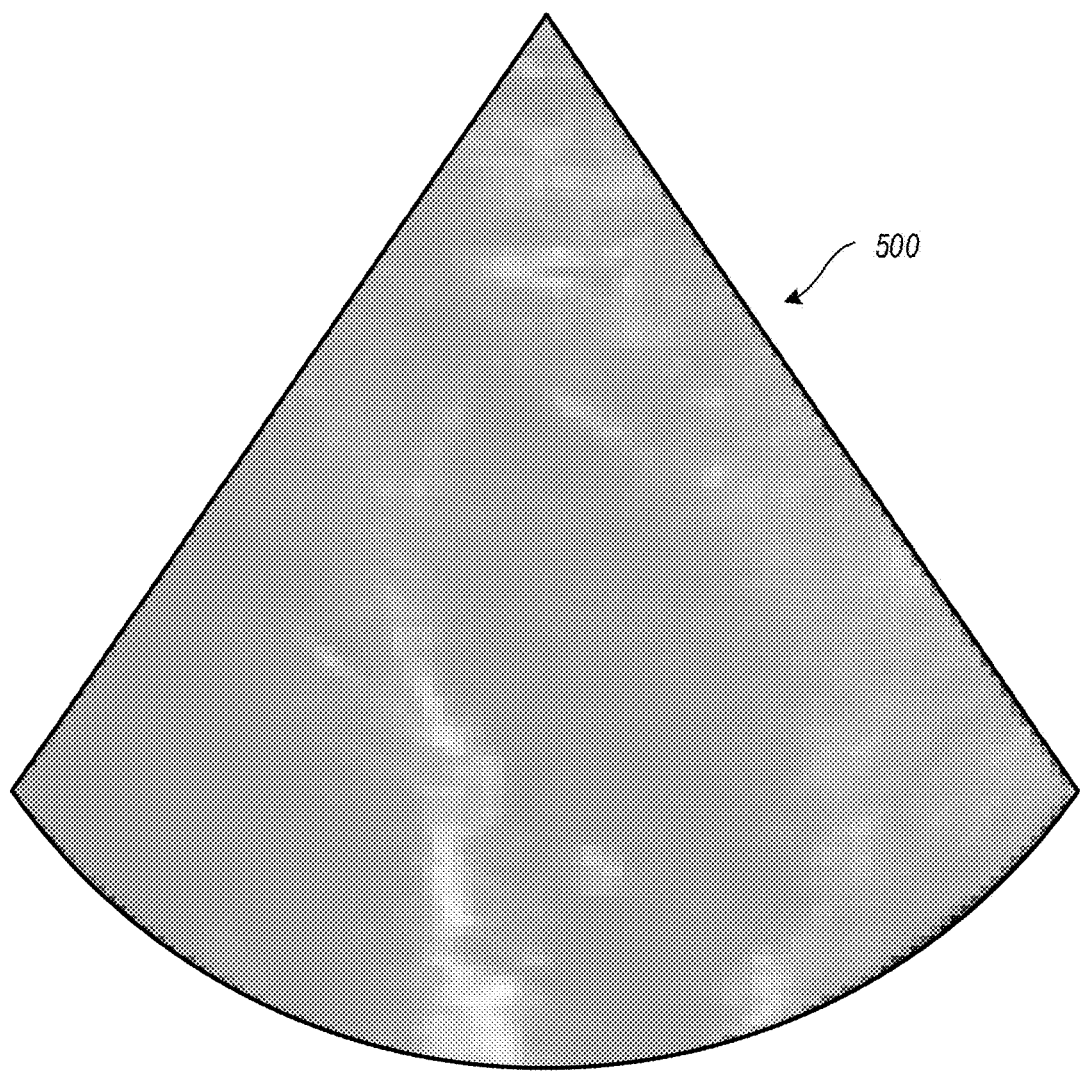
FIG. 5 shows a first sample patient image, an ultrasound image of a human left ventricle.
Figure 8:
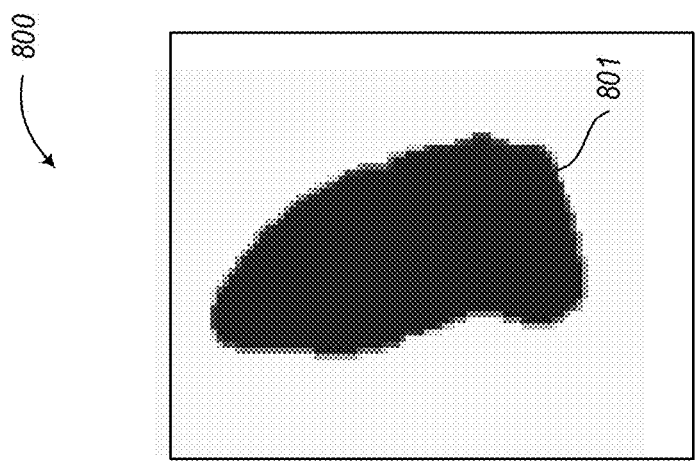
FIG. 8 is a mask diagram showing the segmentation result produced for the first sample image by the third constituent model.
Figure 7:
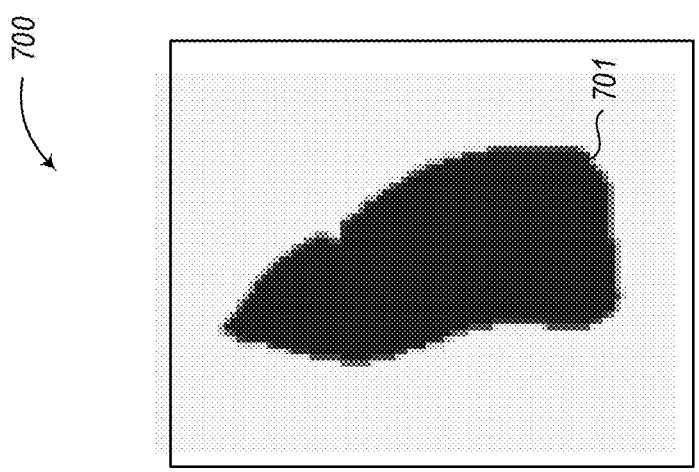
FIG. 7 is a mask diagram showing the segmentation result produced for the first sample image by the second constituent model.
Figure 6:
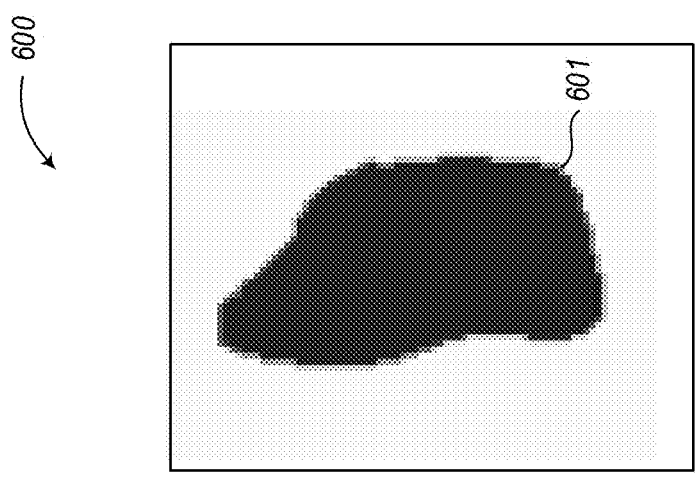
FIG. 6 is a mask diagram showing the result produced for the first sample image by a first of three constituent models.

FIG. 5 is a patient image diagram that shows the first sample patient image. The first sample patient image 500 is an ultrasound image of a human left ventricle. FIGS. 6-8 show the constituent model results for the first sample patient image shown in FIG. 5.

FIG. 6 is a mask diagram showing the segmentation result produced for the first sample image by a first of three constituent models. It can be seen that this constituent model result 600 produced by the first model is a rectangular array of pixels, some of which 601 are shown in a dark color, reflecting that those pixels have a non-zero value, and are thus regarded by this model as showing the left ventricle feature that is being segmented.

FIG. 7 is a mask diagram showing the segmentation result produced for the first sample image by the second constituent model. It can be seen by comparing this constituent model result 700 to constituent model result 600 shown in FIG. 6 that their segmentation masks are different groups of pixels.

FIG. 8 is a mask diagram showing the segmentation result produced for the first sample image by the third constituent model. By comparing this constituent model result 800 to constituent model results 600 and 700 shown in FIGS. 6 and 7, it can be seen that all three constituent model results are different, representing segmentation masks that cover different sets of pixels.

For the first sample image, the facility combines the constituent model results shown in FIGS. 6-8 to obtain an ensemble result in act 405; determines a pixel-wise variance among the constituent model results in act 406; and determines an uncertainty measure of the ensemble result using the pixel-wise variance in act 407. The determined uncertainty measure is 0.045, which the facility inverts to obtain the confidence measure of 22.222 in act 408. Because this confidence measure is greater than a confidence threshold of 9.259, the facility determines the ensemble result to be of high quality, and have a high level of usability. Accordingly, the facility uses the ensemble result for the first image in ways that rely on its accuracy, such as automatically or manually determining and presenting a diagnosis based upon it.

Figure 9:
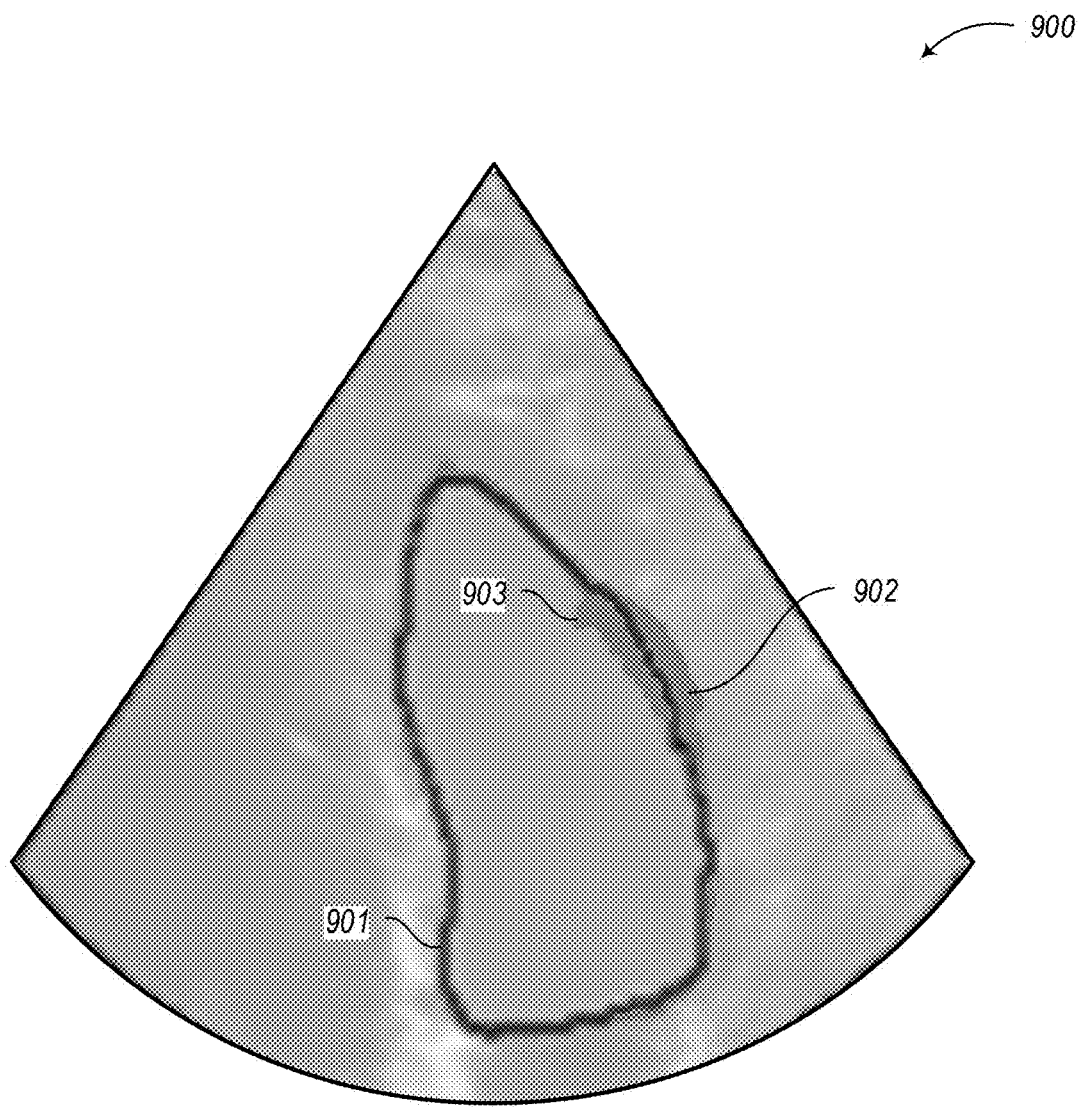
FIG. 9 is an output diagram showing simple output presented by the facility in some embodiments for the first sample patient image.

FIG. 9 is an output diagram showing sample output presented by the facility in some embodiments for the first sample patient image. The output image 900 shows the original patient image, augmented with additional information. First, the patient image has been augmented with a contour 901 showing the border of the ensemble result segmentation mask, i.e., the edge of the left ventricle as predicted by the ensemble model. In the output image, the patient image is further augmented with uncertainty zones, such as uncertainty zones 902 and 903, identifying regions in which the constituent models disagreed about whether they should be included in the segmentation mask.

FIGS. 10-14 show the facility's processing of a second sample patient image.

Figure 10:
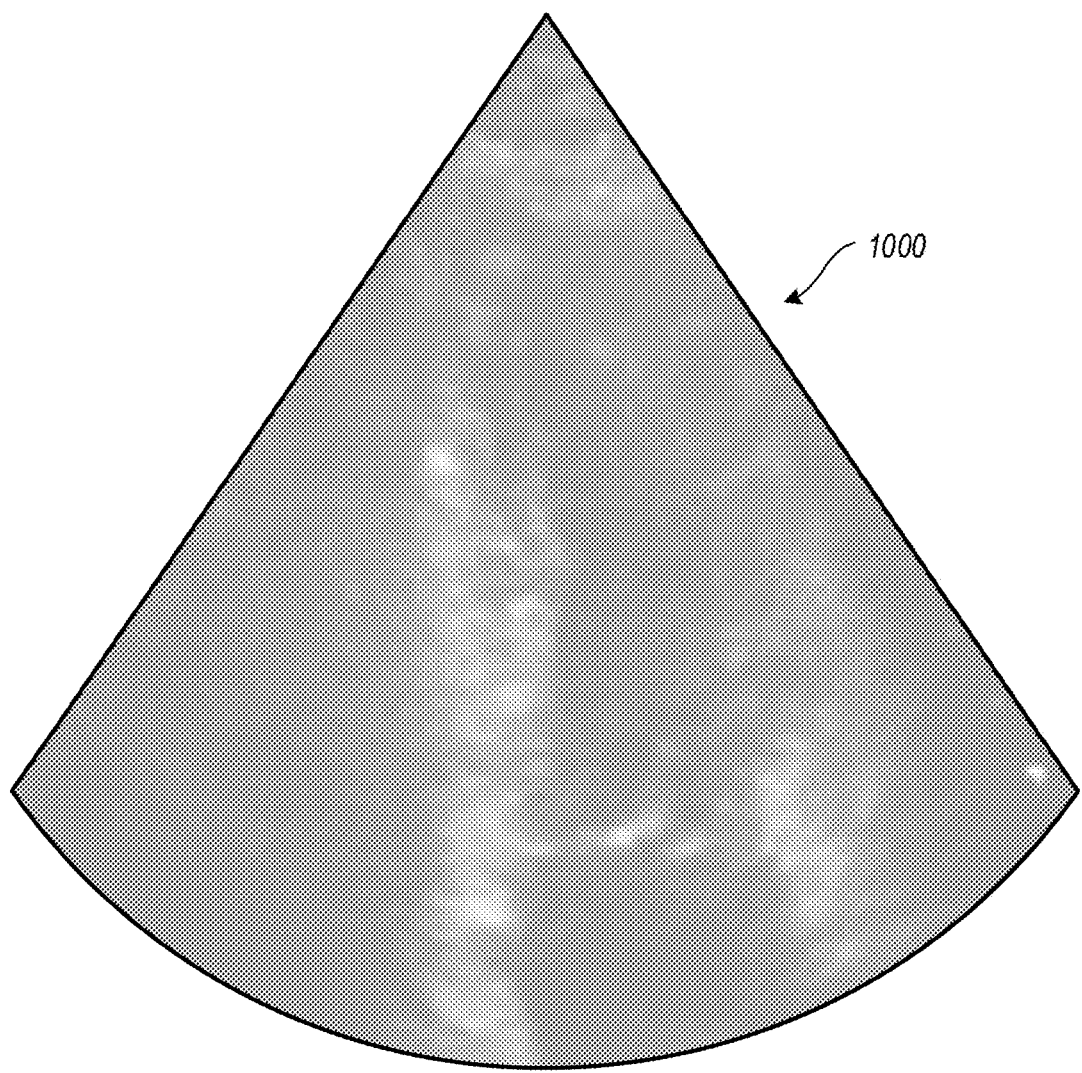
FIG. 10 is a patient image diagram that shows the second sample patient image.
Figure 13:
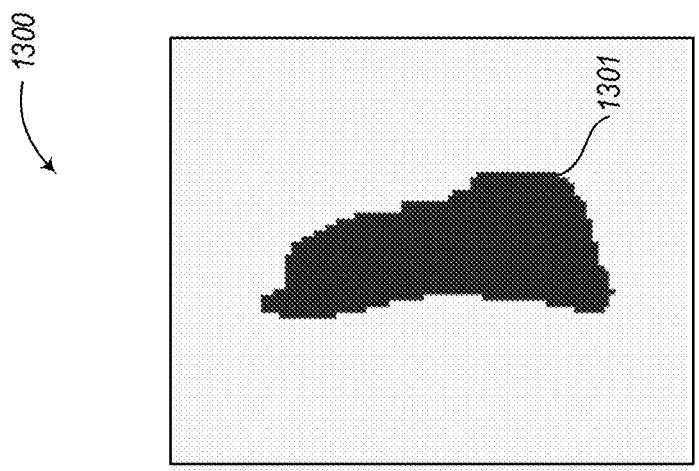
FIG. 13 is a mask diagram showing the segmentation result produced for the second sample image by the third constituent model.
Figure 12:
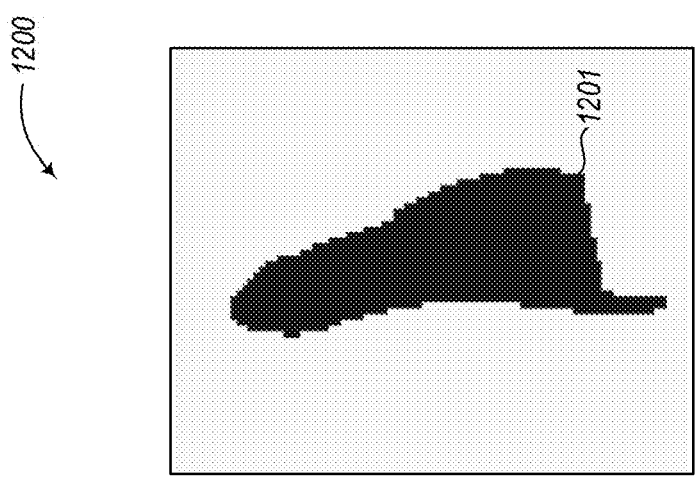
FIG. 12 is a mask diagram showing the segmentation result produced for the second sample image by the second constituent model.
Figure 11:
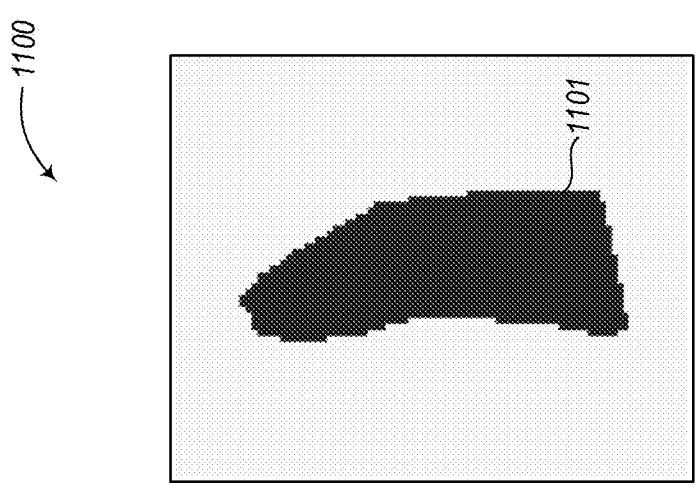
FIG. 11 is a mask diagram showing the segmentation result produced for the second sample image by the first constituent model.

FIG. 10 is a patient image diagram that shows the second sample patient image. Like the first sample patient image, the second sample patient image 1000 is of a human left ventricle. FIGS. 11-13 show the constituent model results for the second sample patient image shown in FIG. 10.

FIG. 11 is a mask diagram showing the segmentation result produced for the second sample image by the first constituent model. This constituent model 1100 includes dark pixels 1101 that are part of the segmentation mask.

FIG. 12 is a mask diagram showing the segmentation result produced for the second sample image by the second constituent model. This constituent model result 1200 includes dark pixels 1201 that make up the segmentation mask.

FIG. 13 is a mask diagram showing the segmentation result produced for the second sample image by the third constituent model. This constituent model result 1300 contains dark pixels 1301, that make up this segmentation mask.

The facility combines the constituent model results shown in FIGS. 11-13 to obtain an ensemble result in act 405; determines a pixel-wise variance among the constituent model results in act 406; and determines an uncertainty measure of the ensemble using the pixel-wise variance in act 407. In particular, for the ensemble result obtained for the second sample image, the facility determines an uncertainty measure of 0.108, which it inverts in act 408 to obtain a confidence measure of 9.259. The facility determines that this confidence measure is below the confidence threshold of 9.434, and accordingly takes action with respect to the ensemble result that reflects a low level of confidence in its accuracy, such as warning the operator about the quality of the image, automatically capturing a substitute image, or presenting an annotated image showing regions in which the constituent models disagree.

Figure 14:
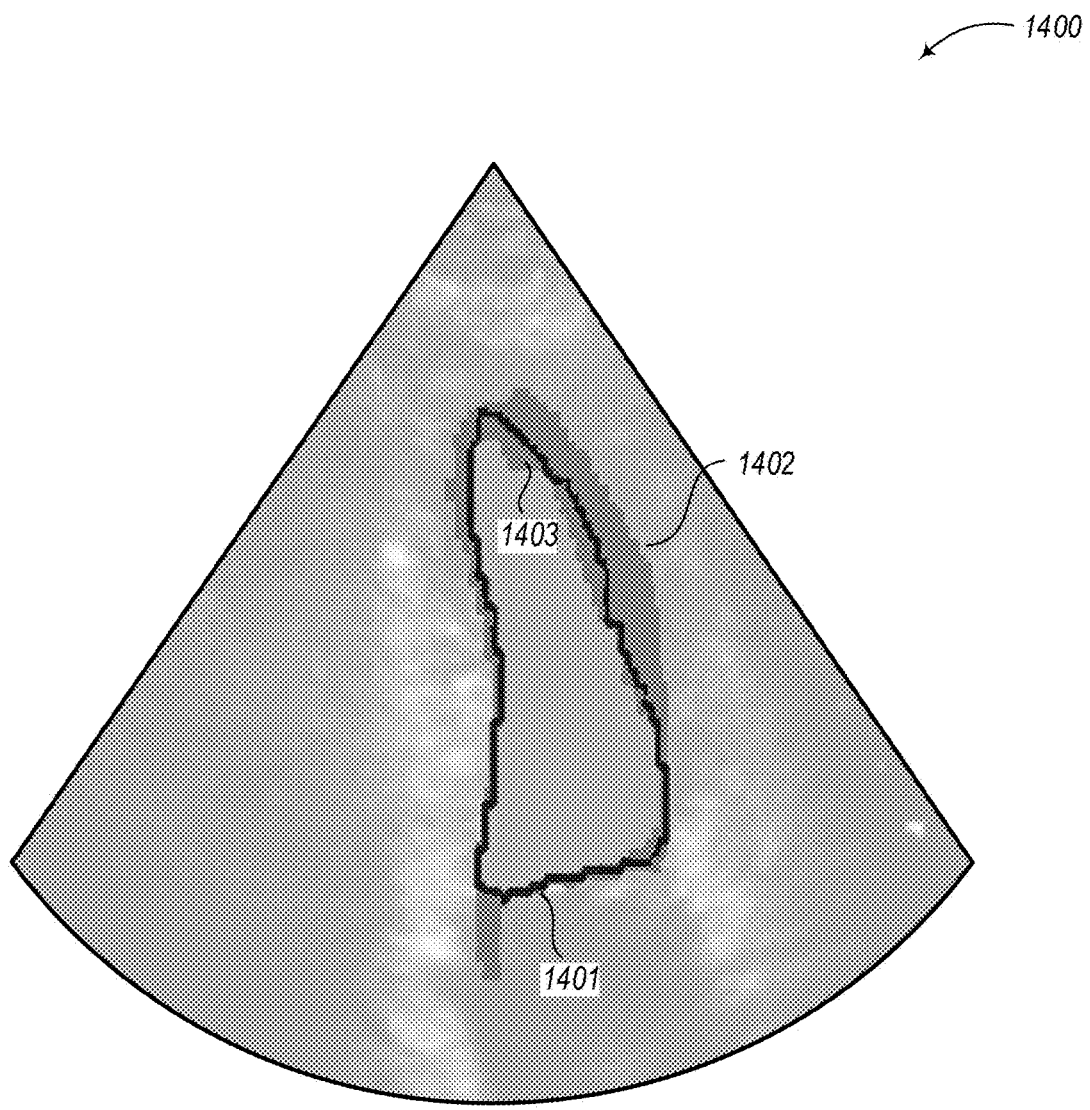
FIG. 14 is an output diagram showing sample output presented by the facility in some embodiments for the second sample patient image.

FIG. 14 is an output diagram showing sample output presented by the facility in some embodiments for the second sample patient image. The output image 1400 shows the original patient image, augmented with additional information. The patient image has been augmented with a contour 1401 showing the border of the ensemble result segmentation mask. In the output image, the patient image is further augmented with uncertainty zones, such as uncertainty zones 1402 and 1403, identifying regions in which the constituent models disagree about whether they should be included in the segmentation mask.

By comparing uncertainty zones shown in FIG. 14 for the second sample patient image to the uncertainties shown in FIG. 9 for the first sample patient image, it can be seen that the uncertainty zones for the second patient image are significantly larger. This is particularly true when the area of these uncertainty zones are compared to the area inside the contours for both sample patient images (i.e., the area of the ensemble result segmentation masks, by which the area of the uncertainty zone is divided to calculate the uncertainty measure).

Figure 15:
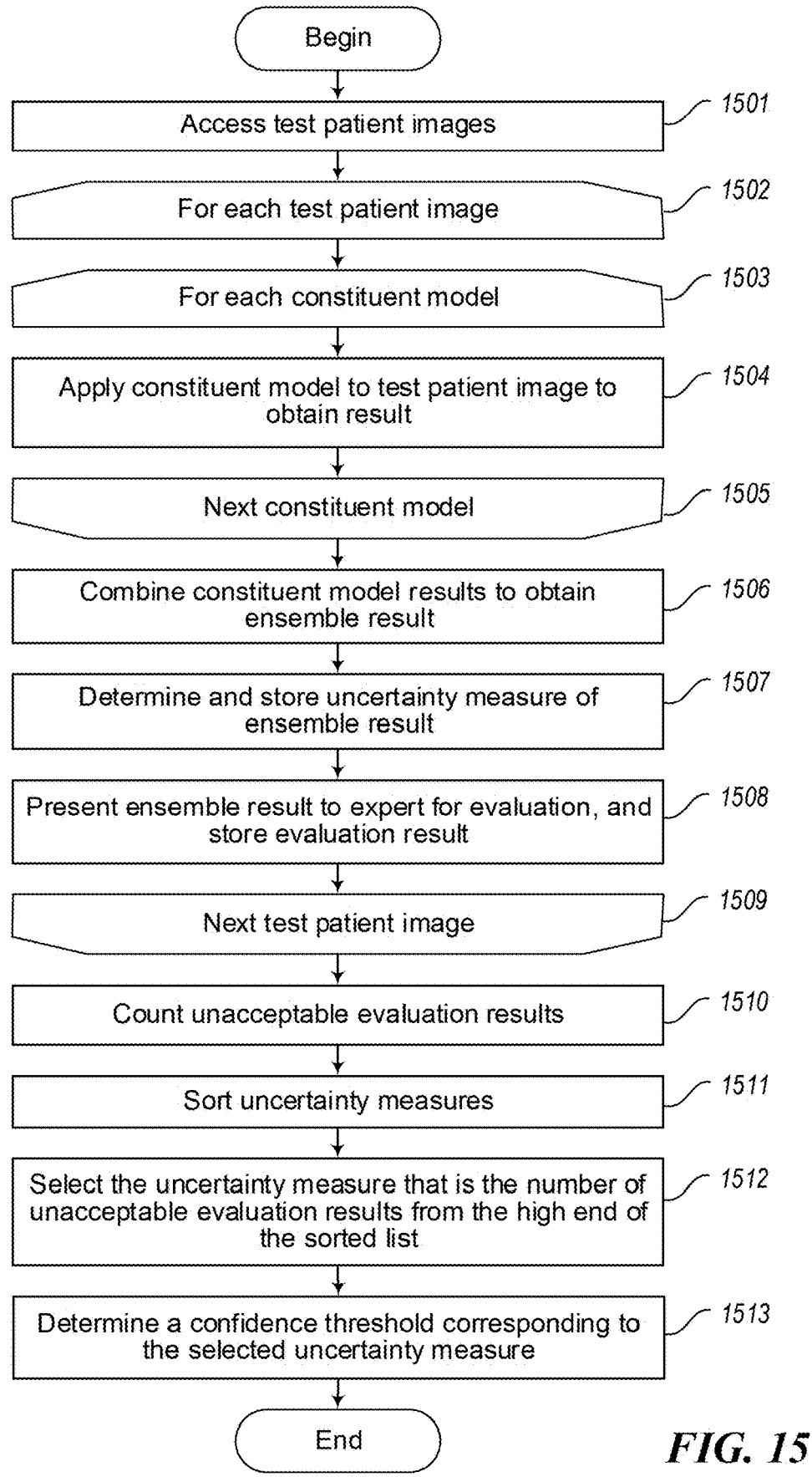
FIG. 15 is a flow diagram showing a process performed by the facility in some embodiments to determine a confidence threshold to use as a basis for selecting processing of the ensemble model result by the facility.

FIG. 15 is a flow diagram showing a process performed by the facility in some embodiments to determine a confidence threshold to use as a basis for selecting processing of the ensemble model result by the facility. In act 1501, the facility accesses a set of test patient images. In acts 1502-1509, the facility loops through each accessed test patient image. In acts 1503-1505, the facility loops through each of the constituent models. In act 1504, the facility applies the constituent model to the test patient image to obtain a result. In act 1505, if other constituent models remain to be applied to this test patient image, then the facility continues in act 1503 to apply the next constituent model to the test patient image, else the facility continues in act 1506. In act 1506, the facility combines the constituent model results obtained in act 1504 for this test patient image to obtain an ensemble result for this test patient image. In act 1507, the facility determines and stores an uncertainty measure of the ensemble result obtained for this test patient image in act 1506. In act 1508, the facility presents the ensemble result to an expert for evaluation, and stores an evaluation result provided by the expert. In some embodiments, this evaluation result indicates whether the ensemble result is acceptable or unacceptable. In some embodiments, the expert determines that the ensemble result is acceptable if it would provide an adequate basis for an accurate diagnosis. In act 1509, if additional test patient images remain to be processed, then the facility continues in act 1502 to process the next test patient image, else the facility continues in act 1510. In act 1510, the facility counts the number of evaluation results stored in act 1508 that were unacceptable. In act 1511, the facility sorts the uncertainty measures determined in act 1507.

Figures 16, 17:
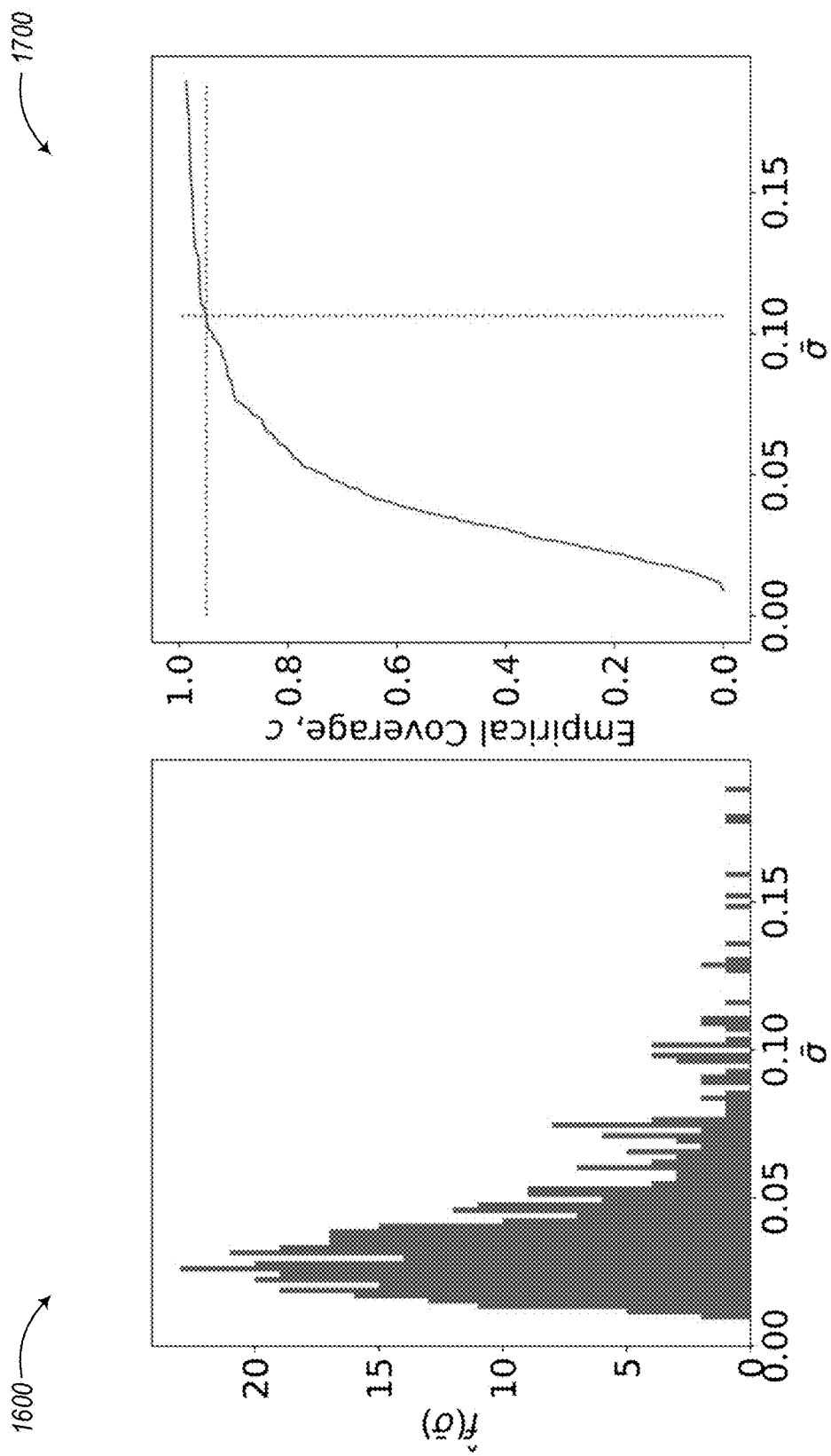
FIG. 16 is a distribution diagram showing the distribution of uncertainty measures determined by the facility for a sample set of test patient images.
FIG. 17 is a distribution diagram showing a cumulative distribution of uncertainty measures for the set of test patient images.

FIG. 16 is a distribution diagram showing the distribution of uncertainty measures determined by the facility for a sample set of test patient images, in which these uncertainty measures can be viewed in sorted order. It can be seen in the distribution diagram 1600 that the largest uncertainty measures d are shown toward the right side of the graph, and the smallest to the left.

Returning to FIG. 15, in act 1512, the facility selects from the sorted list of uncertainty measures obtained in act 1511 the uncertainty measure that is the number of unacceptable evaluation results from the high end of the sorted list. In the example, the facility counted sixteen unacceptable evaluation results in act 1510. Accordingly, the facility counts sixteen places in the sorted list of uncertainty measures from its high end, from 0.195 to 0.106. In the example, 0.106 is the uncertainty measure selected by the facility in act 1512. In act 1513, the facility determines a confidence threshold corresponding to the uncertainty measure selected in act 1512. In some embodiments, the facility performs act 1513 by multiplicatively inverting the uncertainty measure selected in act 1512. In terms of the example, the facility multiplicatively inverts the uncertainty measure 0.106 to obtain a confidence threshold of 9.43.

In some embodiments not shown in FIG. 15, the facility obtains expert evaluation results for only a portion of the entire set of test patient images. In other words, contrary to how shown in FIG. 15 in which act 1508 is performed for the ensemble result produced for each test patient image, in these embodiments, act 1508 is performed only for a proper subset of the ensemble results produced for test patient images. In these embodiments, in act 1512, rather than counting backwards from the highest uncertainty measure by the number of unacceptable evaluation results as shown, the facility: determines what percentage of the total number of obtained evaluation results the counted number of unacceptable evaluation results constitutes, and moves that percentage of the way through the uncertainty measures, from the highest toward the lowest. This can also be described as determining a percentile value among the uncertainty measures corresponding to 1 minus the determined percentage.

FIG. 17 is a distribution diagram showing a cumulative distribution of uncertainty measures for the set of test patient images. Distribution diagram 1700 shows a horizontal line of the Empirical Coverage c value of 0.95, corresponding to a determination by the facility that five percent of the received evaluation results were unacceptable. This horizontal line intersects the cumulative uncertainty measures at the value of $\bar{\sigma}$=0.106, which is the uncertainty measure selected in these embodiment as a basis for determining the confidence threshold in act 1513.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A system, comprising:
an ultrasound sensing device; and
a computing device, the computing device comprising:
  a communication interface configured to directly receive ultrasound echo data sensed by the ultrasound sensing device from a person, the received ultrasound echo data comprising an ultrasound image;
  a memory configured to:
    store a plurality of trained submodels each for generating a segmentation mask for a physiological structure in ultrasound images, and
    store a predetermined uncertainty metric threshold;
  a processor configured to:
    for each of the stored plurality of trained submodels:
      apply the trained submodel to the received ultrasound image to generate a submodel segmentation mask for the received ultrasound image comprising pixels having a first value indicating that they each show the segmented structure and pixels having a second value indicating that they each do not show the segmented structure,
    combine the generated submodel segmentation masks to obtain an ensemble segmentation mask,
    determine a pixel-wise variance among the submodel segmentation masks, in which each pixel has a value indicating a degree to which the submodel segmentation masks have different values for the pixel,
    determine an uncertainty metric for the ensemble segmentation mask based on the number of pixels in which the pixel-wise variance has a value greater than a variance threshold, as compared to the number of pixels in which the ensemble segmentation mask contains the first value; and compare the determined uncertainty metric to the stored predetermined uncertainty metric threshold; and based on the result of the comparison, perform differential processing on the ensemble segmentation mask;

a display device configured to:

display the received ultrasound image; and display together with the ultrasound image results of the differential processing on the ensemble segmentation mask.

2. The system of claim 1 wherein the ultrasound sensing device comprises a transducer.

3. The system of claim 1 wherein the differential processing comprises, only if the determined uncertainty metric is below the predetermined uncertainty metric threshold, using the ensemble segmentation mask to automatically generate a diagnosis.

4. The system of claim 1 wherein the differential processing comprises, only if the determined uncertainty metric exceeds the predetermined uncertainty metric threshold, capturing an additional ultrasound image from the person.

5. The system of claim 1 wherein the differential processing comprises, only if the determined uncertainty metric exceeds the predetermined uncertainty metric threshold, using the pixel-wise variance to identify portions of the ultrasound image about which the submodels disagree.

6. One or more instances of non-transitory computer-readable media collectively having contents configured to cause a computing system to perform a method, the method comprising:

accessing a medical imaging image;

accessing an ensemble machine learning model trained to predict a value of a measure for each of the pixels of a medical imaging image, the ensemble machine learning model comprising a plurality of constituent models each trained to predict a value of the measure for each of the pixels of a medical imaging image, the ensemble machine learning model further comprising information specifying an aggregation technique to be used to determine a result of the ensemble machine learning model from results produced by the constituent models of the plurality;

for each of the constituent models of the plurality, applying the constituent model to the accessed image to produce a constituent model result;

applying the specified aggregation technique to results produced by the constituent models of the plurality to determine a result of the ensemble machine learning model;

for each of the pixels of the accessed image, determining a measure of variation among the values predicted for the pixel among the constituent models; and determining a confidence measure for the determined ensemble machine learning model result based at least in part on for how many of the pixels of the accessed image a variation measure is determined that exceeds a variation threshold.

7. The one or more instances of non-transitory computer-readable media of claim 6, the method further comprising causing a visual indication the determined confidence measure to be presented in connection with a visual depiction of the ensemble machine learning model result.

8. The one or more instances of non-transitory computer-readable media of claim 6, the method further comprising performing differential processing based on the determined confidence measure.

9. The one or more instances of non-transitory computer-readable media of claim 8, the method further comprising accessing a plurality of testing medical imaging images each captured from a different patient;

for each of the plurality of testing images:

for each of the constituent models of the plurality, applying the constituent model to the testing image to produce a constituent model result;

applying the specified aggregation technique to results produced by the constituent models of the plurality to determine a result of the ensemble machine learning model;

for each of the pixels of the testing image, determining a measure of variation among the values predicted for the pixel among the constituent models;

determining a confidence measure for the determined ensemble machine learning model result based at least in part on for how many of the pixels of the testing image a variation measure is determined that exceeds a variation threshold;

receiving input indicating whether a human expert found the determined ensemble machine learning model result to be of acceptable quality;

counting the number of testing images for which input was received indicating that a human expert found the determined ensemble machine learning model result not to be of acceptable quality;

sorting the confidence measures determined for the testing images;

selecting as a confidence threshold the confidence measure determined for a testing image that is the counted number of unacceptable results away from the low end of the sorted confidence measures; and comparing the confidence measure determined for the accessed image to the selected confidence threshold as a basis for performing the differential processing.

10. The one or more instances of non-transitory computer-readable media of claim 6 wherein the medical imaging image was captured from a distinguished patient, and wherein the differential processing comprises, only if the determined confidence measure is below a confidence measure threshold, automatically capturing an additional ultrasound medical imaging image from the distinguished patient.

11. The one or more instances of non-transitory computer-readable media of claim 6 wherein the differential processing comprises, only if the determined confidence measure is below a confidence measure threshold, causing the accessed image to be displayed in a way that visually identifies pixels for which the determined measure of variation exceeds the variation threshold.

12. The one or more instances of non-transitory computer-readable media of claim 6 wherein the differential processing comprises, only if the determined uncertainty metric is above a confidence measure threshold, using the determined result of the ensemble machine learning model to automatically generate a diagnosis.

13. The one or more instances of non-transitory computer-readable media of claim 6 wherein the accessed image is an ultrasound image.

14. The one or more instances of non-transitory computer-readable media of claim 6 wherein the result produced by each of the constituent models predicts whether each pixel of the accessed image shows part of a distinguished physiological structure.

15. The one or more instances of non-transitory computer-readable media of claim 6 wherein the result produced by each of the constituent models predicts whether each pixel of the accessed image shows part of an organ landmark.

16. The one or more instances of non-transitory computer-readable media of claim 6 wherein the result produced by each of the constituent models predicts whether each pixel of the accessed image shows is at an edge of a distinguished physiological structure.

17. The one or more instances of non-transitory computer-readable media of claim 6, the method further comprising training each of the plurality of constituent models.

18. One or more instances of non-transitory computer-readable media collectively storing a visual presentation data structure, the data structure comprising:
for each of a grid of pixels, data indicating how the pixel is to be displayed, the data indicating how a first subset of the pixels of the grid is to be displayed comprising first data, the first subset of pixels corresponding to pixels of an input medical imaging image for which at least a threshold number of a plurality of machine learning models agreed that a first value should be predicted,
the data indicating how a second subset of the pixels of the grid distinct from the first subset is to be displayed comprising second data different from the first data, the second subset of pixels corresponding to pixels of an input medical imaging image for which less than the threshold number of the plurality of machine learning models agreed whether a first value should be predicted,
such that the contents of the data structure are usable to display a prediction image showing a prediction with respect to the input medical imaging image made by the plurality of machine learning models reflecting a level of certainty of the plurality of machine learning models.

19. The one or more instances of non-transitory computer-readable media of claim 18, wherein the data indicating how a third subset of the pixels of the grid distinct from the first and second subsets is to be displayed comprising third data different from the first data and different from the second data, the first subset of pixels corresponding to pixels of an input medical imaging image for which at least a threshold number of a plurality of machine learning models agreed that a second value different from the first value should be predicted.

20. The one or more instances of non-transitory computer-readable media of claim 18 wherein the first data and second data each comprise data specifying hue.

21. The one or more instances of non-transitory computer-readable media of claim 18 wherein the first data and second data each comprise data specifying intensity.

22. The one or more instances of non-transitory computer-readable media of claim 18 wherein the prediction by each of the machine learning models of the plurality for each of the pixels of the grid predicts the presence of a distinguished physiological structure in a corresponding pixel of the input medical imaging image.

23. A hardware networking device conveying a visual presentation data structure, the data structure comprising:
for each of a grid of pixels, data indicating how the pixel is to be displayed, the data indicating how a first subset of the pixels of the grid is to be displayed comprising first data, the first subset of pixels corresponding to pixels of an input medical imaging image for which at least a threshold number of a plurality of machine learning models agreed that a first value should be predicted,
the data indicating how a second subset of the pixels of the grid distinct from the first subset is to be displayed comprising second data different from the first data, the second subset of pixels corresponding to pixels of an input medical imaging image for which less than the threshold number of the plurality of machine learning models agreed whether a first value should be predicted,
such that the contents of the data structure are usable to display a prediction image showing a prediction with respect to the input medical imaging image made by the plurality of machine learning models reflecting a level of certainty of the plurality of machine learning models.

24. The hardware networking device of claim 23, wherein the data indicating how a third subset of the pixels of the grid distinct from the first and second subsets is to be displayed comprising third data different from the first data and different from the second data, the first subset of pixels corresponding to pixels of an input medical imaging image for which at least a threshold number of a plurality of machine learning models agreed that a second value different from the first value should be predicted.

25. The hardware networking device of claim 23 wherein the first data and second data each comprise data specifying hue.

26. The hardware networking device of claim 23 wherein the first data and second data each comprise data specifying intensity.

27. The hardware networking device of claim 23 wherein the prediction by each of the machine learning models of the plurality for each of the pixels of the grid predicts the presence of a distinguished physiological structure in a corresponding pixel of the input medical imaging image.

28. A method in a computing system, comprising:
accessing a medical imaging image;
accessing an ensemble machine learning model trained to predict a value of a measure for each of the pixels of a medical imaging image, the ensemble machine learning model comprising a plurality of constituent models each trained to predict a value of the measure for each of the pixels of a medical imaging image, the ensemble machine learning model further comprising information specifying an aggregation technique to be used to determine a result of the ensemble machine learning model from results produced by the constituent models of the plurality;
for each of the constituent models of the plurality, applying the constituent model to the accessed image to produce a constituent model result;
applying the specified aggregation technique to results produced by the constituent models of the plurality to determine a result of the ensemble machine learning model;
for each of the pixels of the accessed image, determining a measure of variation among the values predicted for the pixel among the constituent models; and
determining a confidence measure for the determined ensemble machine learning model result based at least in part on for how many of the pixels of the accessed image a variation measure is determined that exceeds a variation threshold.

29. The method of claim 28, further comprising causing a visual indication the determined confidence measure to be presented in connection with a visual depiction of the ensemble machine learning model result.

30. The method of claim 28, further comprising performing differential processing based on the determined confidence measure.

31. The method of claim 30, further comprising
accessing a plurality of testing medical imaging images each captured from a different patient;
for each of the plurality of testing images:
  for each of the constituent models of the plurality, applying the constituent model to the testing image to produce a constituent model result;
  applying the specified aggregation technique to results produced by the constituent models of the plurality to determine a result of the ensemble machine learning model;
  for each of the pixels of the testing image, determining a measure of variation among the values predicted for the pixel among the constituent models;
  determining a confidence measure for the determined ensemble machine learning model result based at least in part on for how many of the pixels of the testing image a variation measure is determined that exceeds a variation threshold;
  receiving input indicating whether a human expert found the determined ensemble machine learning model result to be of acceptable quality;
counting the number of testing images for which input was received indicating that a human expert found the determined ensemble machine learning model result not to be of acceptable quality;
sorting the confidence measures determined for the testing images;
selecting as a confidence threshold the confidence measure determined for a testing image that is the counted number of unacceptable results away from the low end of the sorted confidence measures; and
comparing the confidence measure determined for the accessed image to the selected confidence threshold as a basis for performing the differential processing.

32. The method of claim 28 wherein the medical imaging image was captured from a distinguished patient,
and wherein the differential processing comprises, only if the determined confidence measure is below a confidence measure threshold, automatically capturing an additional ultrasound medical imaging image from the distinguished patient.

33. The method of claim 28 wherein the differential processing comprises, only if the determined confidence measure is below a confidence measure threshold, causing the accessed image to be displayed in a way that visually identifies pixels for which the determined measure of variation exceeds the variation threshold.

34. The method of claim 28 wherein the differential processing comprises, only if the determined uncertainty metric is above a confidence measure threshold, using the determined result of the ensemble machine learning model to automatically generate a diagnosis.

35. The method of claim 28 wherein the accessed image is an ultrasound image.

36. The method of claim 28 wherein the result produced by each of the constituent models predicts whether each pixel of the accessed image shows part of a distinguished physiological structure.

37. The method of claim 28 wherein the result produced by each of the constituent models predicts whether each pixel of the accessed image shows part of an organ landmark.

38. The method of claim 28 wherein the result produced by each of the constituent models predicts whether each pixel of the accessed image shows is at an edge of a distinguished physiological structure.

39. The method of claim 28, further comprising training each of the plurality of constituent models.

\* \* \* \* \*